(12) United States Patent
Fahmy

(10) Patent No.: US 10,397,759 B1
(45) Date of Patent: Aug. 27, 2019

(54) SYSTEM, METHOD AND APPARATUS FOR COLLECTING INVENTORY SCAN DATA

(71) Applicant: Zebra Technologies Corporation, Lincolnshire, IL (US)

(72) Inventor: Ahmed M. S. F. A. K. Fahmy, Chicago, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 15/983,311

(22) Filed: May 18, 2018

(51) Int. Cl.
  *G06Q 30/00* (2012.01)
  *H04W 4/35* (2018.01)
  *G06K 7/10* (2006.01)

(52) U.S. Cl.
  CPC .......... *H04W 4/35* (2018.02); *G06K 7/10386* (2013.01); *G06K 7/10405* (2013.01)

(58) Field of Classification Search
  USPC ................................................ 235/383, 385
  See application file for complete search history.

(56) References Cited

U.S. PATENT DOCUMENTS

| | | | |
|---|---|---|---|
| 7,388,491 B2 | 6/2008 | Chand et al. | |
| 7,468,650 B2 | 12/2008 | Childress et al. | |
| 7,734,507 B2 | 6/2010 | Ritter | |
| 7,916,028 B2 | 3/2011 | Oberle | |
| 9,076,119 B2 | 7/2015 | Jain et al. | |
| 2007/0156545 A1* | 7/2007 | Lin | G06Q 10/00 705/28 |
| 2010/0187306 A1 | 7/2010 | Solomon | |

OTHER PUBLICATIONS

"Software for RFID Asset Tracking Systems". Downloaded from Internet @ http://gaorfid.com/gao-asset-tracking-software/. Retrieved on Aug. 14, 2018.

* cited by examiner

*Primary Examiner* — Jamara A Franklin
(74) *Attorney, Agent, or Firm* — Yuri Astvatsaturov

(57) ABSTRACT

A method of collecting inventory scan data at a mobile scanner includes: obtaining a location identifier corresponding to a location containing a plurality of inventory tags for wireless scanning; obtaining scan criteria corresponding to the location identifier, the scan criteria indicating a target position and a target orientation for the mobile scanner; determining whether a current position and a current orientation of the mobile scanner match the target position and the target orientation; when the determination is affirmative, initiating a wireless scan of the inventory tags; and collecting and storing inventory scan data from the inventory tags responsive to initiating the wireless scan.

23 Claims, 6 Drawing Sheets

SYSTEM, METHOD AND APPARATUS FOR COLLECTING INVENTORY SCAN DATA

BACKGROUND

Various facilities, such as retail stores, warehouses and the like, may contain significant numbers of objects (e.g. retail products, packages, etc.). Conducting an inventory check, for example to collect an accurate listing of which objects are present in the facility and their location within the facility, is often a task performed manually by one or more staff members of the facility. However, manual inventory checking is time-consuming and error-prone process. Certain systems therefore employ radio frequency identification (RFID) tags affixed to each of the objects in a facility, permitting an RFID reader to detect which objects are present. Such RFID-based systems, however, may require substantial investment in infrastructure, and may also be prone to interference (e.g. from physical obstructions in the facility, from interfering wireless transmissions, and the like) that introduces errors into the inventory checking process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
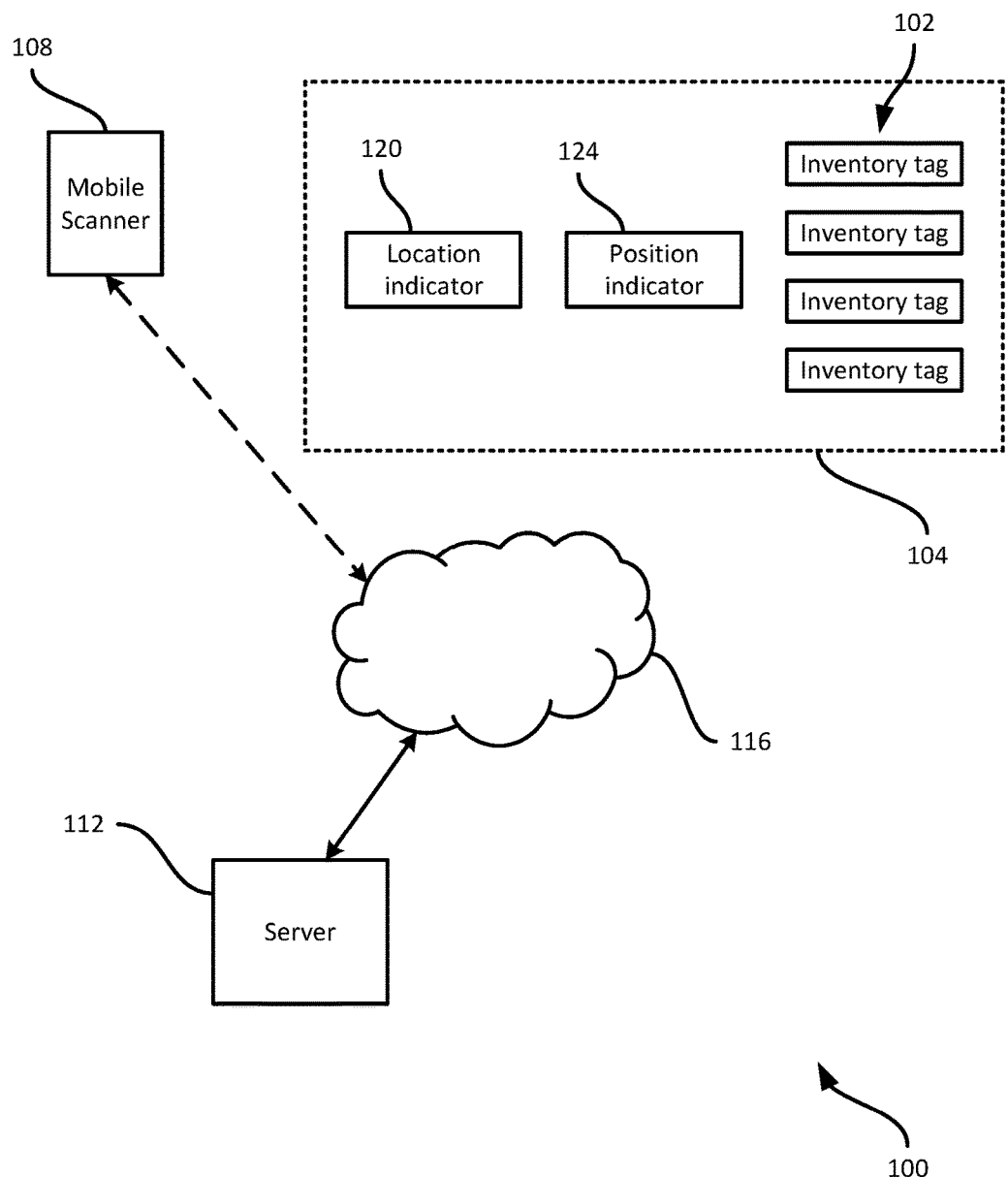
FIG. 1 is a block diagram of a system for collecting inventory scan data.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of collecting inventory scan data at a mobile scanner including: obtaining a location identifier corresponding to a location containing a plurality of inventory tags for wireless scanning; obtaining scan criteria corresponding to the location identifier, the scan criteria indicating a target position and a target orientation for the mobile scanner; determining whether a current position and a current orientation of the mobile scanner match the target position and the target orientation; when the determination is affirmative, initiating a wireless scan of the inventory tags; and collecting and storing inventory scan data from the inventory tags responsive to initiating the wireless scan.

Additional examples disclosed herein are directed to a mobile scanner for collecting inventory scan data, comprising: an tag reader; a memory a processor connected with the tag reader and the memory, the processor configured to: obtain a location identifier corresponding to a location containing a plurality of inventory tags for wireless scanning; obtain scan criteria corresponding to the location identifier, the scan criteria indicating at least one of a target position and a target orientation for the mobile scanner; determine whether at least one of a current position and a current orientation of the mobile scanner match the at least one of the target position and the target orientation in the scan criteria; when the determination is affirmative, control the tag reader to initiate a wireless scan of the inventory tags; and collect and store inventory scan data from the inventory tags in the memory responsive to initiating the wireless scan.

FIG. 1 depicts a system 100 for collecting inventory scan data. The system 100 includes a plurality of inventory tags 102, such as RFID tags, affixed to objects in a location 104, such as a retail store, a warehouse, a storage room in a medical facility (e.g. a hospital), or the like. The system 100 also includes a mobile scanning device 108 (also referred to as a mobile scanner 108), such as a handheld RFID scanner. The mobile scanner 108 can be implemented as a single integrated device, or as a combination of devices, such as a handheld RFID reader coupled to a mobile computing device such as a smart phone.

The mobile scanner 108 is configured to scan the tags 102 (which contain product identifiers such as stock keeping unit (SKU) IDs or the like) and transmit the data obtained during the scan to a repository, such as a server 112. The mobile scanner 108 and the server 112 are connected via a network 116, which may be any suitable combination of wireless and wired networks. The server 112 may be deployed at the location 104 or remotely from the location. The server 112 can be deployed as a discrete computing device or as a virtual computing device implemented on one or more computing devices (e.g. a cloud-based server).

Although a single location 104 is shown in FIG. 1, the system 100 may include a plurality of locations 104, and the mobile scanner 108 is movable to collect inventory scan data as mentioned above at any of the locations. The system 100 therefore also includes a location indicator 120 deployed at each location 104. The mobile scanner 108 is configured, as will be discussed in greater detail, to interact with the location indicator 120 to determine an identifier of the location 104 at which the mobile scanner 108 is present (e.g. permitting the server 112 to associate received inventory scan data with the appropriate location 104). Further, each location 104 may have a different physical layout. The position of the mobile scanner 108 within a given location 104 may affect the quality of the collected scan data. For example, in certain positions the mobile scanner 108 may fail to detect certain tags 102. Therefore, the system 100 also includes a position indicator 124 at each location 104. As discussed below in greater detail, the position indicator 124 is employed as a guide for the mobile scanner 108, to conduct the inventory scan at a predefined position within the location 104.

Figure 2:
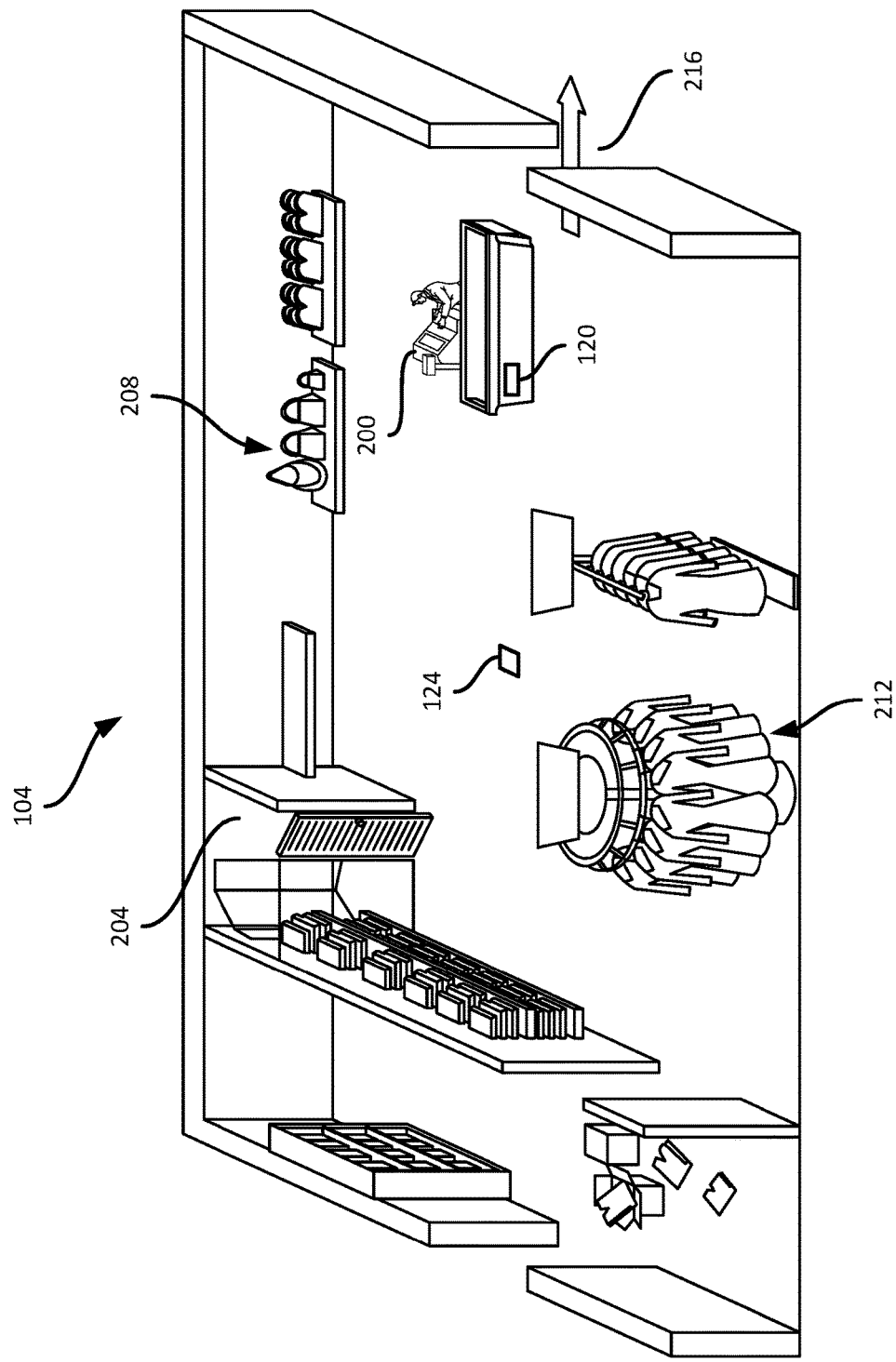
FIG. 2 is a schematic view of an environment in which the system of FIG. 1 is deployed

FIG. 2 illustrates an example location 104, in the form of a retail sales floor including a point-of-sale (PoS) station 200. The server 112, in some examples, is deployed the PoS station 200, while in other examples the server 112 is remote from the location 104. The location 104, in the illustrated example, also includes a fitting room 204, and a plurality of RFID-tagged objects, such as handbags 208, clothes 212 and the like. That is, each object 208, 212, has an RFID tag 102 associated therewith (not visible in FIG. 2), for example by physical attachment of the RFID tag to the object. In other examples, a group of objects are associated with a single RFID tag 102 (e.g. a pallet of objects in a warehouse).

Also deployed in the location 104 is the previously mentioned location indicator 120. In the illustrated example, the location indicator 120 (e.g. an RFID tag, a machine-readable graphical indicator such as a barcode, QR code or the like) is affixed at the PoS station 200. In other examples, however, the location indicator 120 can be placed at any other suitable position in the location, such as adjacent to an entrance 216 to the location 104. Also shown in the location 104 is the above-mentioned position indicator 124. In the illustrated example the position indicator 124 is placed on a floor of the location 104, but in other examples the position indicator 124 can be placed on a ceiling, a wall, or the like. In general, the position indicator 124 is placed at or near a predefined position from which an inventory scan is to be initiated by the mobile scanner 108.

Before discussing the functionality of the system 100 in greater detail, certain components of the mobile scanner 108 and the server 112 will be described with reference to FIGS. 3A and 3B.

Figure 3A:
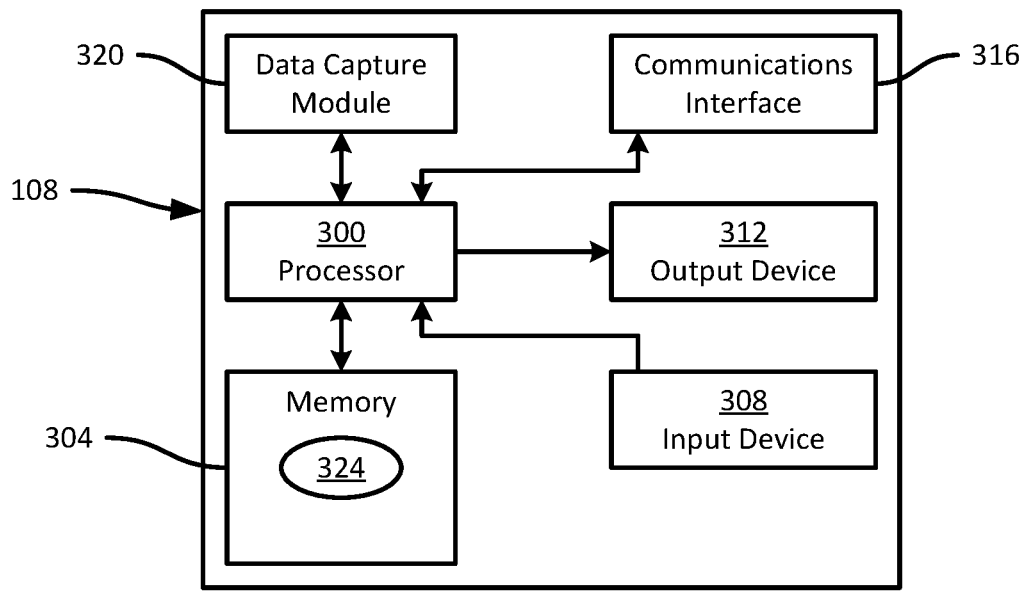
FIGS. 3A and 3B are block diagrams of certain internal hardware components of the mobile scanner and server, respectively, of FIG. 1.

As shown in FIG. 3A, the mobile scanner 108 includes a central processing unit (CPU), also referred to as a processor 300, interconnected with a non-transitory computer readable storage medium, such as a memory 304. The memory 304 includes any suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the processor 300 and the memory 304 each comprise one or more integrated circuits.

The mobile scanner 108 also includes at least one input device 308 interconnected with the processor 300. As will be apparent to those skilled in the art, the input device 308 is configured to receive input and provide data representative of the received input to the processor 300. The input device 308 includes any one of, or a suitable combination of, a touch screen, a keypad, a trigger button, a microphone, and the like. The mobile scanner 108 also includes at least one output device 312 interconnected with the processor 300. The output device 312, in the present example, includes a display (e.g. a flat-panel display integrated with the above-mentioned touch screen). The output device 312 can also include, in addition to or instead of the above-mentioned display, any one of, or a suitable combination of, a speaker, a notification LED, and the like.

The mobile scanner 108 also includes a communications interface 316 interconnected with the processor 300. The communications interface 316 includes any suitable hardware (e.g. transmitters, receivers, network interface controllers and the like) allowing the mobile scanner 108 to communicate with other computing devices, such as the server 112, via a link with the network 116 or directly with the other computing devices. The specific components of the communications interface 316 are selected based on the type of network or other links that the mobile scanner 108 is required to communicate over.

The mobile scanner also includes a data capture module 320 interconnected with the processor 300. The data capture module 320, in the present example, enables the mobile scanner 108 to interrogate the tags 102 in the location 104, to obtain data stored on the tags 102, such as the above-mentioned product identifiers. In other words, the data capture module 320 is an RFID reader assembly, including a suitable set of antenna elements and associated control hardware and software for emitting RFID interrogation signals, as well as detecting and decoding response signals from the tags 102.

The memory 304 of the mobile scanner 108 stores a plurality of applications, each including a plurality of computer readable instructions executable by the processor 300. The execution of the above-mentioned instructions by the processor 300 causes the mobile scanner 108 to implement certain functionality, as discussed herein. The applications are therefore said to be configured to perform that functionality in the discussion below. In the present example, the memory 304 of the mobile scanner 108 stores an inventory scanning application 324, also referred to herein as the application 324. The mobile scanner 108 is configured, via execution of the application 324 by the processor 300, to interact with the server 112, as well as the infrastructural elements (e.g. the indicators 120 and 124) deployed at the location 104, to collect inventory scan data via control of the data capture module 320.

In other examples, the processor 300, as configured by the execution of the application 324, is implemented as one or more specifically-configured hardware elements, such as field-programmable gate arrays (FPGAs) and/or application-specific integrated circuits (ASICs).

Figure 3B:
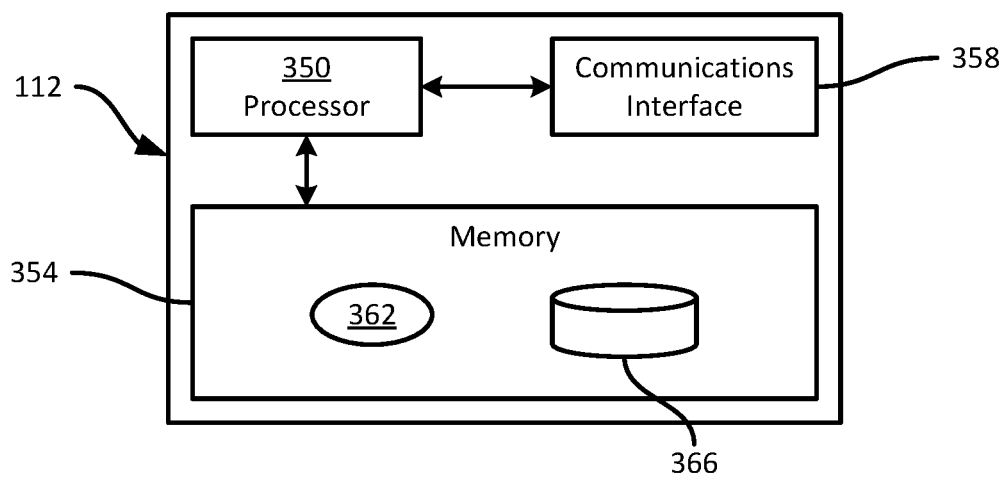

Referring to FIG. 3B, the server 112 includes a central processing unit (CPU), also referred to as a processor 350, interconnected with a non-transitory computer readable storage medium, such as a memory 354. The memory 354 includes any suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the processor 350 and the memory 354 each comprise one or more integrated circuits.

The server 112 also includes a communications interface 358 interconnected with the processor 350. The communications interface 358 includes any suitable hardware (e.g. transmitters, receivers, network interface controllers and the like) allowing the server 112 to communicate with other computing devices, such as the mobile scanner 108, via a link with the network 116 or directly with the other computing devices. The specific components of the communications interface 358 are selected based on the type of network or other links that the server 112 is required to communicate over.

The memory 354 of the server 112 stores a plurality of applications, each including a plurality of computer readable instructions executable by the processor 350. The execution of the above-mentioned instructions by the processor 350 causes the server 112 to implement certain functionality, as discussed herein. The applications are therefore said to be configured to perform that functionality in the discussion below. In the present example, the memory 354 of the server 112 stores a scanning control application 362, also referred to herein as the application 362. The server 112 is configured, via execution of the application 362 by the processor 350, to interact with mobile scanner 108 to provide data to the mobile scanner 108 to enable the above-mentioned collection of inventory scan data, and to receive the resulting inventory scan data. The data provided to, and received from, the mobile scanner 108 by the server 112 can be stored in a repository 366, such as a database.

Figure 4:
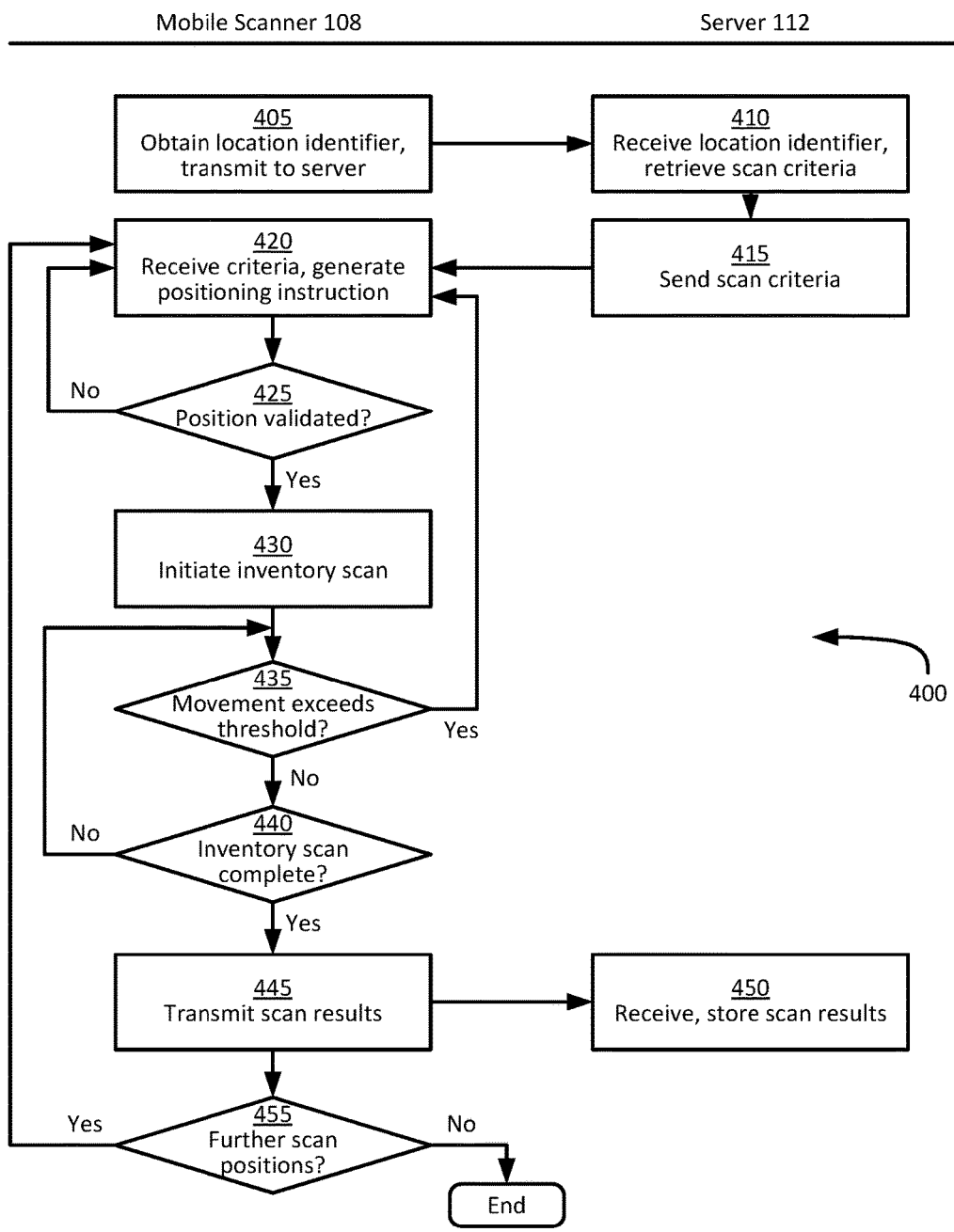
FIG. 4 is a flowchart of a method for collecting inventory scan data.

Turning now to FIG. 4, a method 400 of collecting inventory scan data is illustrated. The method 400 will be described in conjunction with its performance in the system 100. In particular, certain blocks of the method 400 are performed by the mobile scanner 108 (e.g. via execution of the application 324), while other blocks of the method 400 are performed by the server 112 (e.g. via execution of the application 362).

At block 405, the mobile scanner 108 is configured to obtain a location identifier corresponding to the location 104. The location identifier is obtained from the location indicator 120 at the location 104. The location indicator 120, in some examples, is a beacon (e.g. a Bluetooth™ Low Energy (BLE) beacon, UWB transmitter or the like) configured to periodically transmit a beacon signal containing a location identifier. In other examples, the location indicator 120 is an RFID tag storing the location identifier. In further examples, the location indicator 120 is a machine-readable graphic, such as a barcode, encoding the location identifier.

Upon arrival at the location 104, the mobile scanner 108 can therefore be configured to obtain the location identifier by detecting the above-mentioned beacon signal, reading the above-mentioned RFID tag, scanning the above-mentioned barcode, or the like. The mobile scanner 108 may be configured to send authentication parameters (e.g. a login and password) to the server 112 prior to block 405. Following successful authentication, the mobile scanner 108 can be configured to present a prompt via the output device 312 for causing the operator of the mobile scanner 108 to locate the location indicator 120 and activate the input device 308 to obtain the location identifier.

Having obtained the location identifier, the mobile scanner 108 is configured to transmit the location identifier to the server 112 via the network 116. In some examples, the mobile scanner 108 is preconfigured with a store network identifier (e.g. a URL) for the server 112. In other examples, the network identifier itself is also obtained from the location identifier.

At block 410, the server 112 is configured to receive the location identifier from the mobile scanner 108, and to retrieve a set of scan criteria from the memory 354 (e.g. from the repository. The server 112 stores, for each location identifier (e.g. corresponding to each distinct location 104), scan criteria for use by the mobile scanner 108 in completing an inventory scan. The scan criteria include, for example, an indication of a predefined scan position (also referred to as a target position) within the location 104. The scan criteria can also include an orientation or a sequence of orientations (also referred to as target orientations) at which the mobile scanner 108 is to be placed during the inventory scan operation.

At block 415, the server 112 is configured to send the scan criteria retrieved at block 410 to the mobile scanner 108. At block 420 the mobile scanner 108 is configured to generate a positioning instruction based on the received scan criteria. For example, the scan criteria for the location 104 as illustrated in FIG. 2 can include a map of the location (e.g. an image file or the like) indicating the position of the position indicator 124 within the location 104. At block 420, the mobile scanner 108 can therefore be configured to present the map, along with a prompt (e.g. via text presented on a display, sound played from a speaker, or the like) instructing the operator of the mobile scanner 108 to transport the mobile scanner 108 to the position indicator 124. The mobile scanner 108 can also present a prompt for the operator to activate the input device 308 upon arrival at the position indicator 124, to initiate validation of the position of the mobile scanner 108 before the inventory scan is performed.

Figure 5A:
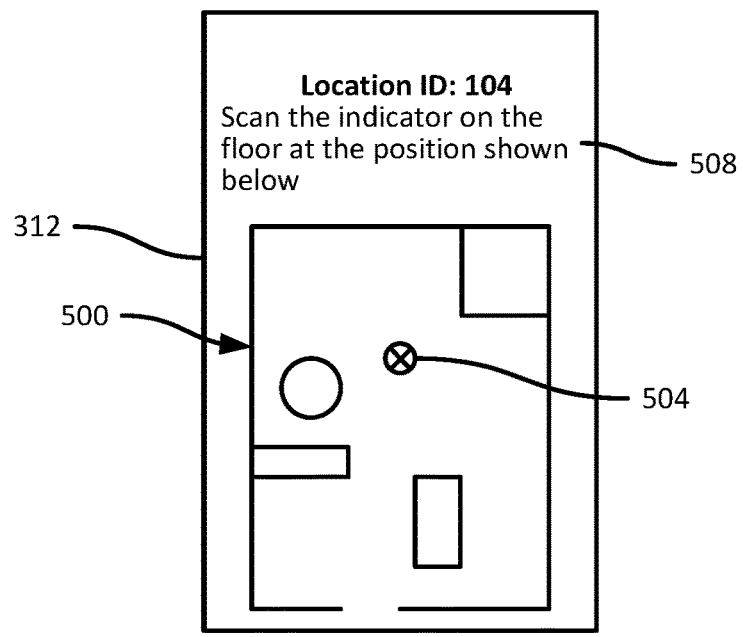
FIGS. 5A and 5B are diagrams of instructions presented by the mobile scanner of FIG. 1 during the performance of the method of FIG. 4.

Turning to FIG. 5A, an example positioning instruction is shown as generated on the output device 312 (e.g. a display). In particular, the positioning instruction includes an image 500 representing a map of the location 104, with a marker 504 indicating the position of the position indicator 124. The positioning instruction can also include a text string 508 (audio may be generated instead of, or in addition to, the text string) indicating the location identifier to which the positioning instruction relates, and instructing the operator of the mobile scanner 108 to proceed to the position indicator 124 as indicated on the map 500.

At block 425, the mobile scanner 108 (e.g. in response to activation of the input device 308 as mentioned above) is configured to determine whether the mobile scanner 108 is in the correct position and/or orientation for performing an inventory scan. The position and/or orientation can be defined in the scan criteria provided by the server 112 at block 415. For example, in addition to specifying the position of the mobile scanner 108 on the floor (e.g., with respect to a predetermined coordinate system of the floor space), the scan criteria can specify an angular orientation for the mobile scanner (e.g. both heading, as detected by the compass of the mobile scanner 108, and angle of inclination relative to the floor of the location 104, as determined by a gyroscope or other sensor of the mobile scanner 108). Such criteria can be presented to the operator of the mobile scanner 108 via the output device 312.

The scan criteria can also specify, for example, that the mobile scanner 108 must obtain data from the position indicator 124 while satisfying the above-mentioned orientation. The position indicator 124 can be an RFID tag, graphical indicator (e.g. a barcode) or the like, from which data may only be obtained by the mobile scanner 108 when the mobile scanner is adjacent to the position at which the position indicator 124 is affixed. The above-mentioned activation of the input device 308 in response to the positioning instruction causes the mobile scanner 108 to scan or otherwise capture the position indicator 124 when the mobile scanner 108 is positioned and oriented to successfully scan or capture the indicator 124.

In other words, the scan criteria are selected to constrain the mobile scanner 108 to a given position and orientation within the location 104 in order to optimize the quality of the scan. When the determination at block 425 is negative (e.g. when the data stored or encoded by the position indicator 124 is not successfully obtained, when the orientation of the mobile scanner does not comply with the above-mentioned criteria, or both), the mobile scanner 108 returns to block 420. Following a negative determination at block 425, the mobile scanner 108 can be configured to present (e.g. via the output device 312) further prompts with additional positioning instructions. For example, a detected current orientation of the mobile scanner 108 can be presented relative to the target orientation on a display. When the determination at block 425 is affirmative, however, the performance of method 400 proceeds to block 430.

At block 430, the mobile scanner 108 is configured to initiate the collection of inventory scan data. As will be apparent to those skilled in the art, the collection of inventory scan data can include controlling the data capture module 320 to emit one or more interrogation signals, and to detect and decode a plurality of response signals emitted by the tags 102. The performance of block 430 can begin automatically responsive to an affirmative determination at block 425, or the operator of the mobile scanner 108 can be prompted, responsive to an affirmative determination at block 425, to activate the input device 308 to begin the scan at block 430.

During the performance of the inventory scan, the mobile scanner 108 can be configured to present (e.g. via the output device 312) a graphical indication, and/or an audible indication, of an orientation in which to place the mobile scanner 108. Referring briefly to FIG. 2, to capture data from every tag 102 in the location 104 it may be necessary for the mobile scanner 108 to revolve through an arc (e.g. 360 degrees) during the scan. The scan criteria from the server 112, as noted above, can specify a sequence of orientations at which the mobile scanner 108 is to be placed during the scan. For example, the sequence of orientations can be specified as compass headings and associated time periods (e.g. due north for two seconds, due east for two seconds, and so on). The mobile scanner 108 can be configured to present the next specified orientation in the sequence via the output device, and to continue the scan when the specified orientation is reached.

Figure 5B:
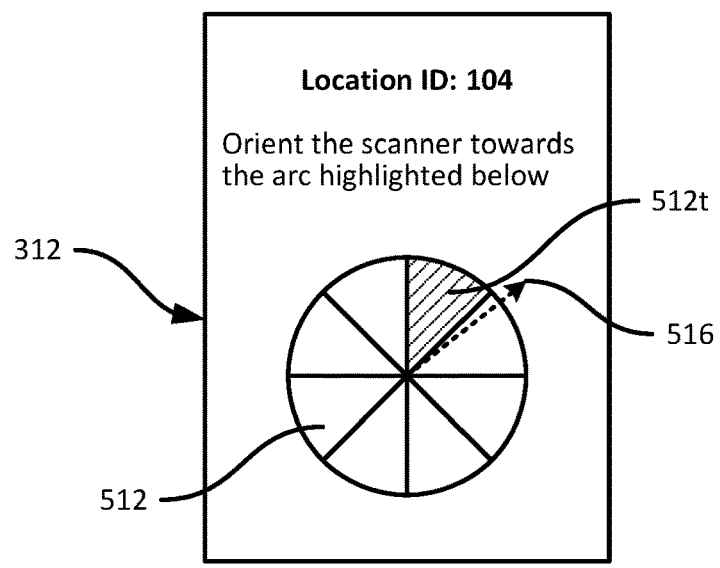

The sequence of orientations can define both two-dimensional and three-dimensional arcs or other segments of movement. For example, the sequence can include a substantially vertical arc (e.g. from thirty degrees below horizontal to thirty degrees above horizontal) to be conducted at each of a plurality of compass headings. Referring to FIG. 5B, an example instruction is shown as generated on the output device 312 (e.g. a display) during the scan initiated at block 430. The instruction includes a plurality of wedges defining a sequence of orientations through which the mobile scanner 108 is to be passed during the scan, as well as an arrow 516 indicating the current orientation of the mobile scanner 108 and a text string 520 instructing the operator of the mobile scanner 108 to place the mobile scanner 108 in an orientation aligned with the target arc 512t.

At block 435, the mobile scanner 108 is configured to determine whether movement of the mobile scanner 108 exceeds a predetermined threshold. For example, the mobile scanner 108 can include an accelerometer in addition to the above-mentioned gyroscope and compass. The above-mentioned sensors can be monitored during the inventory scan to detect a deviation from the required position and orientation that were validated at block 425. For example, an acceleration beyond a threshold may indicate that the mobile scanner 108 is no longer located adjacent to the position indicator 124, or that the mobile scanner 108 has moved through one of the arcs defined in the scan criteria at a greater velocity than specified by the scan criteria. When the determination at block 435 is affirmative, the scan is aborted, and performance of the method 400 returns to block 420 for re-positioning of the mobile scanner 108.

When the determination at block 435 is negative (i.e. when the mobile scanner 108 remains at the validated position and orientation) the mobile scanner 108 determines whether the scan is complete at block 440. The determination at block 440 can include, for example, a determination of whether every orientation in the sequence included in the scan criteria has been traversed. In other examples, the determination at block 440 can include a determination of whether any previously undetected tag identifiers have been received (e.g. once all tag responses contain tag identifiers previously received during the scan, it is likely that all tags 102 in the location 104 have been read).

When the determination at block 440 is negative, the scan continues until either an affirmative determination at block 435 or an affirmative determination at block 440 is made.

When the determination at block 440 is affirmative, the mobile scanner 108 is configured to transmit the results of the scan (i.e. the collected identifiers of the tags 102 in the location 104) to the server 112 at block 445. The server 112 is configured to receive and store (e.g. in the repository 366) the scan results at block 450.

In some examples, a location 104 (e.g. the sales floor of FIG. 2) may be sufficiently large that more than one scan is required to capture data from the inventory tags 102. In such examples, the scan criteria received at block 420 define two or more scan positions. A corresponding number of position indicators 124 (e.g. one per scan position) may be deployed in the location 104. In such examples, having completed a scan, the mobile scanner 108 is configured to proceed to block 455, and to determine whether further scan positions remain to be performed. When the determination at block 455 is affirmative, the mobile scanner 108 is configured to return to block 420, and to generate a further positioning instruction for the next scan position. When the determination at block 455 is negative, the performance of method 400 ends. In some examples, the collected scan data can be stored at the mobile scanner 108 until all scans are complete, and transmitted following a negative determination at block 455.

In some examples, the determination at block 455 can include an assessment of scan quality for the scan completed at block 440. For example, the scan criteria can include a minimum number of expected tag reads; if a smaller number of tags 102 were detected during the scan than the minimum, the determination at block 455 is affirmative, and a further scan position and/or orientation is employed (or a previous scan position and/or orientation can be repeated), as the low number of detected tags 102 is indicative of insufficient scan performance. The above-mentioned assessment of scan quality can also be performed by the server 112, and the determination at block 455 can include a determination of whether further scan criteria have been received from the server 112 (e.g. containing a further scan position and/or orientation or a command to repeat a previous scan).

Variations to the above systems and methods are contemplated. For example, in some embodiments the location and position indicators 120 and 124 can be deployed as a single indicator, such as a barcode, QR code or the like encoding the location identifier and placed at the predefined scan position. In other embodiments, the indicators 120 and 124 are distinct (e.g. an RFID tag and a barcode, respectively), but implemented in a shared physical package, such as a barcode label with an embedded RFID tag. In further embodiments, a plurality of location and/or position indicators are deployed in a location 104. For example, a plurality of RFID tags can be deployed as one or both of the indicators 120 and 124, and the mobile scanner 108 can be configured to triangulate a position within the location, e.g. from time-of-flight data and known predefined locations of the tags.

Figure 6:
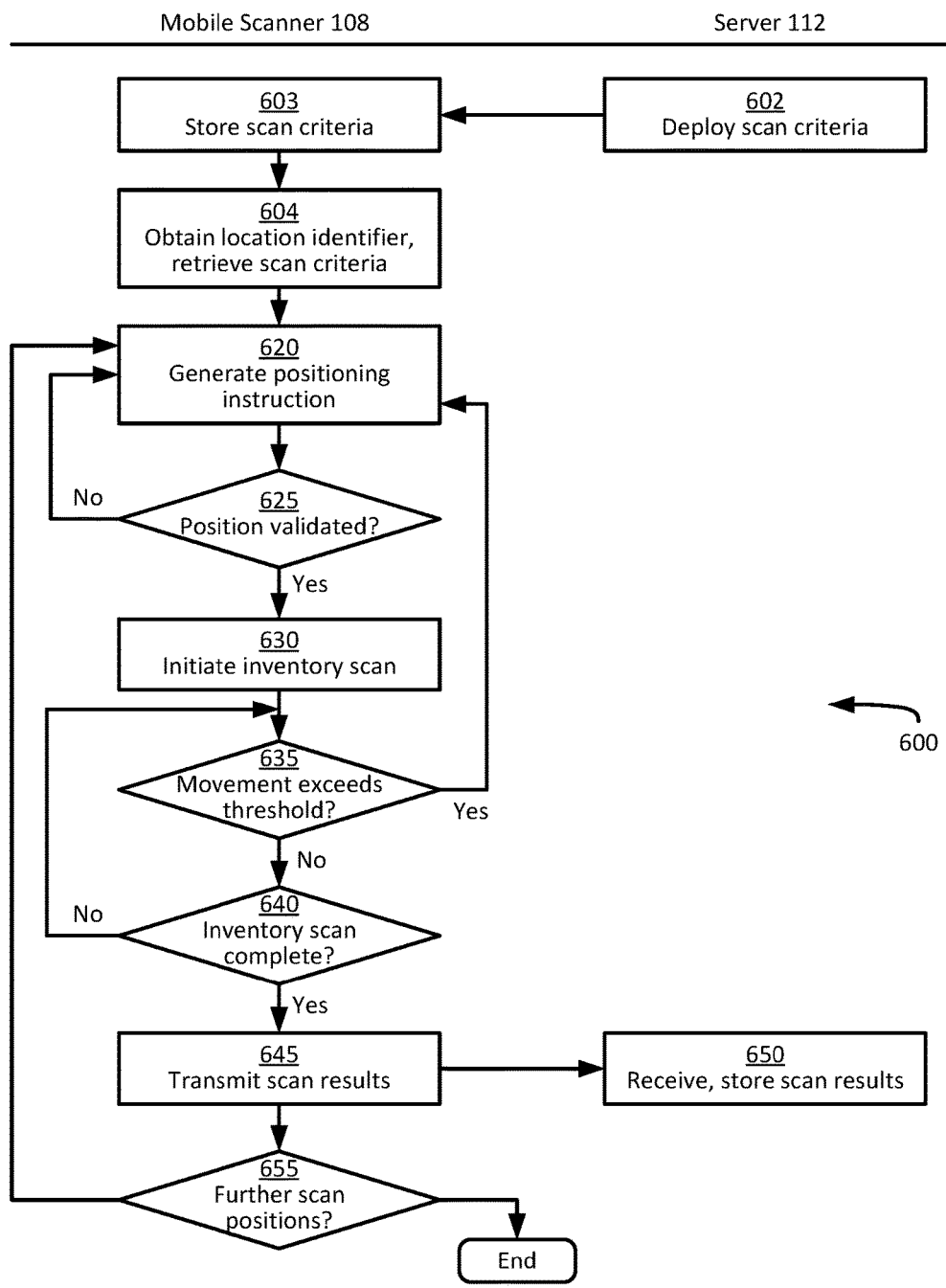
FIG. 6 is a flowchart of a method for collecting inventory scan data, according to another embodiment.

In some embodiments, certain functionality described above as being implemented at the server 112 is performed by the mobile scanner 108. Referring to FIG. 6, a method 600 of collecting inventory scan data is illustrated, in which the blocks having common suffixes with blocks of FIG. 4 are as described above. That is, blocks 620-655 of the method 600 are as described above in connection with blocks 420-455 of the method 400. In the method 600, however, the mobile scanner 108 is configured to store the scan criteria and location identifiers in the memory 304. For example, the server 112 can periodically, at block 602, deploy location identifiers and scan criteria to the mobile scanner 108. The mobile scanner 108 is configured to store the location identifiers and scan criteria at block 603. Further, at block 604 the mobile scanner 108 is configured to obtain a location identifier (as described above in connection with block 405) and to retrieve the corresponding scan criteria from memory. The server 112 is configured to deploy updated data to the mobile scanner 108 in response to, for example, changes to the physical layout of the location 104, addition of new locations 104, scan quality assessments (e.g. indicating that a recently completed scan did not detect some of the tags 102) or the like.

In further embodiments, certain functionality described above as being performed by the mobile scanner 108 is performed by the server 112. For example, the mobile scanner 108 can be configured to report motion sensor data to the server 112, and the server 112 can be configured to perform the determinations at one or more of blocks 425 and 435. More specifically, in some examples the mobile scanner 108 is configured to record initial motion sensor data during the performance of block 425 and, upon position validation, transmit the initial motion sensor data to the server 112. The mobile scanner 108 is then configured to transmit motion sensor data to the server 112 during the scan, and the server is configured to perform the determination at block 435 by comparing the received motion sensor data with the initial motion sensor data. Other divisions of the functionality illustrated in FIGS. 3 and 6 between the mobile scanner 108 and the server 112 are also contemplated.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of collecting inventory scan data at a mobile scanner, comprising:

obtaining a location identifier corresponding to a location containing a plurality of inventory tags for wireless scanning;
obtaining scan criteria corresponding to the location identifier, the scan criteria indicating at least one of a target position and a target orientation for the mobile scanner;
determining whether at least one of a current position and a current orientation of the mobile scanner match the at least one of the target position and the target orientation in the scan criteria;
when the determination is affirmative, initiating a wireless scan of the inventory tags; and
collecting and storing inventory scan data from the inventory tags responsive to initiating the wireless scan.

2. The method of claim 1, wherein obtaining the location identifier includes capturing the location identifier from a location indicator deployed at the location.

3. The method of claim 2, wherein the location indicator is one of a short-range wireless beacon, a radio frequency identification (RFID) tag, and a machine-readable graphic.

4. The method of claim 1, wherein obtaining the scan criteria includes sending the location identifier from the mobile scanner to a server, and receiving the scan criteria from the server.

5. The method of claim 1, wherein obtaining the scan criteria includes storing the scan criteria in a memory of the mobile scanner, and retrieving the scan criteria responsive to obtaining the location identifier.

6. The method of claim 1, further comprising:
responsive to initiating the wireless scan, collecting motion data from a motion sensor of the mobile scanner; and
when the motion data indicates movement of the mobile scanner that exceeds a threshold, aborting the wireless scan.

7. The method of claim 1, further comprising:
when the determination is negative, presenting a further positioning instruction, and repeating the determination.

8. The method of claim 1, further comprising:
responsive to completion of the wireless scan, transmitting the inventory scan data to a server.

9. The method of claim 1, wherein the scan criteria indicates at least one of a plurality of target positions and a plurality of target orientations at the location containing the plurality of inventory tags.

10. The method of claim 1, further comprising:
initiating an additional scan of the inventory tags corresponding to at least one of an additional target position and an additional target orientation responsive to a determination that the inventory scan data does not satisfy a threshold.

11. The method of claim 10, wherein the threshold is a minimum number of unique inventory tags.

12. A mobile scanner for collecting inventory scan data, comprising:
a tag reader;
a memory
a processor connected with the tag reader and the memory, the processor configured to:
obtain a location identifier corresponding to a location containing a plurality of inventory tags for wireless scanning;
obtain scan criteria corresponding to the location identifier, the scan criteria indicating at least one of a target position and a target orientation for the mobile scanner;
determine whether at least one of a current position and a current orientation of the mobile scanner match the at least one of the target position and the target orientation in the scan criteria;
when the determination is affirmative, control the tag reader to initiate a wireless scan of the inventory tags; and
collect and store inventory scan data from the inventory tags in the memory responsive to initiating the wireless scan.

13. The mobile scanner of claim 12, wherein the processor is configured to obtain the location identifier by capturing the location identifier from a location indicator deployed at the location.

14. The mobile scanner of claim 13, wherein the location indicator is one of a short-range wireless beacon, a radio frequency identification (RFID) tag, and a machine-readable graphic.

15. The mobile scanner of claim 12, further comprising a communications interface connected with the processor; wherein the processor is configured to obtain the scan criteria by controlling the communications interface to:
send the location identifier to a server; and
receive the scan criteria from the server.

16. The mobile scanner of claim 12, wherein the processor is configured to obtain the scan criteria by:
storing the scan criteria in the memory; and
retrieving the scan criteria from the memory responsive to obtaining the location identifier.

17. The mobile scanner of claim 12, further comprising a motion sensor; wherein the processor is further configured to:
responsive to initiating the wireless scan, collect motion data from the motion sensor; and
when the motion data indicates movement of the mobile scanner that exceeds a threshold, aborting the wireless scan.

18. The mobile scanner of claim 12, wherein the processor is further configured to:
when the determination is negative, present a further positioning instruction, and repeat the determination.

19. The mobile scanner of claim 12, further comprising a communications interface connected with the processor; wherein the processor is further configured to:
responsive to completion of the wireless scan, transmit the inventory scan data to a server via the communications interface.

20. The mobile scanner of claim 12, wherein the scan criteria indicates at least one of a plurality of target positions and a plurality of target orientations at the location containing the plurality of inventory tags.

21. The mobile scanner of claim 12, wherein the processor is further configured to:
initiate an additional scan of the inventory tags corresponding to at least one of an additional target position and an additional target orientation responsive to a determination that the inventory scan data does not satisfy a threshold.

22. The mobile scanner of claim 21, wherein the threshold is a minimum number of unique inventory tags.

23. A non-transitory computer readable medium having stored thereon computer executable instructions for collecting inventory scan data at a mobile scanner, the instructions comprising:
obtaining a location identifier corresponding to a location containing a plurality of inventory tags for wireless scanning;

obtaining scan criteria corresponding to the location identifier, the scan criteria indicating at least one of a target position and a target orientation for the mobile scanner;

determining whether at least one of a current position and a current orientation of the mobile scanner match the at least one of the target position and the target orientation in the scan criteria;

when the determination is affirmative, initiating a wireless scan of the inventory tags; and collecting and storing inventory scan data from the inventory tags responsive to initiating the wireless scan.

* * * * *